United States Patent [19]

Desautels et al.

[11] Patent Number: 5,597,435
[45] Date of Patent: Jan. 28, 1997

[54] METHOD USING RESTRAINED CAULS FOR COMPOSITE MOLDING

[75] Inventors: John T. Desautels, Albuquerque, N.M.; Timothy J. Bayer, Cincinnati, Ohio; Juan R. Mora, Albuquerque, N.M.

[73] Assignee: General Electric Company, Cincinnati, Ohio

[21] Appl. No.: 473,388

[22] Filed: Jun. 7, 1995

Related U.S. Application Data

[62] Division of Ser. No. 996,451, Dec. 24, 1992.

[51] Int. Cl.$^6$ ........................................ B32B 31/04
[52] U.S. Cl. .................. 156/245; 156/285; 156/307.4; 156/312; 264/250; 264/255; 264/257; 264/258; 264/313
[58] Field of Search ................................ 264/257, 258, 264/313, 517, 250, 255, 324; 425/394, 403, 405.1; 156/245, 285, 307.1, 307.4, 311, 312, 583.3

[56] References Cited

U.S. PATENT DOCUMENTS

| | | |
|---|---|---|
| 3,165,569 | 1/1965 | Bright . |
| 3,715,559 | 2/1973 | Norcross et al. . |
| 4,167,430 | 9/1979 | Arachi . |
| 4,267,147 | 5/1981 | Pogoda et al. . |
| 4,271,116 | 6/1981 | Jones . |
| 4,388,263 | 6/1983 | Prunty . |
| 4,620,890 | 11/1986 | Myers et al. . |
| 4,683,099 | 7/1987 | Buxton et al. . |
| 4,702,870 | 10/1987 | Setterholm et al. . |
| 4,904,436 | 2/1990 | Rackal . |
| 4,946,563 | 8/1990 | Yeatts . |
| 4,954,209 | 9/1990 | Baron . |
| 5,051,224 | 9/1991 | Donatelli et al. . |
| 5,104,474 | 4/1992 | Scola et al. ........................ 156/286 |
| 5,145,621 | 9/1992 | Pratt . |
| 5,190,773 | 3/1993 | Damon . |
| 5,204,042 | 4/1993 | James et al. . |

FOREIGN PATENT DOCUMENTS 2184053  6/1987  United Kingdom .

*Primary Examiner*—Michael W. Ball
*Assistant Examiner*—Richard Crispino
*Attorney, Agent, or Firm*—Andrew C. Hess; David L. Narciso

[57] ABSTRACT

A mold system for a curable composite material. The mold receives the uncured plies of the composite material. A restraining member is attached to the mold to restrain a forcing member. The forcing member is positioned between the mold and the restraining member. At least a portion of the uncured plies are positioned between the mold and the forcing member. The forcing member is comprised of an elastomeric material having a high thermal coefficient of expansion. The assembly of plies, mold, forcing member and restraining member is placed in a furnace and heated. As the assembly is heated, the forcing member uniformly expands with increasing temperature. However, since the forcing member is constrained between the restraining member, whose purpose is to restrain the forcing member, the forcing member expands in a preselected direction determined by the shape of the mold, the forcing member, the composite part and the restraining member. The expansion however is limited by the mold. The result is that a pressure is uniformly applied to the composite material plies causing them to compact as the temperature is raised, uniformly increasing the pressure on the plies until the curing temperature is reached. The present invention also provides a method for molding a curable, laminated composite material plies comprised of fibers in a curable resin matrix.

5 Claims, 5 Drawing Sheets

METHOD USING RESTRAINED CAULS FOR COMPOSITE MOLDING

This application is a division of application Ser. No. 07/996,451, filed Dec. 24, 1992.

BACKGROUND OF INVENTION

1. Field of the Invention

This invention relates to an apparatus and a method for manufacturing non-metallic laminate materials and, more particularly, to a device and method to manufacture nonmetallic turbine engine components.

2. Description Of the Prior Art

There is a continual demand to design turbine engine components such as used on jet aircraft of lighter weight materials to increase the aircraft's fuel efficiency and thrust capabilities. Originally, many jet aircraft components were made of steel. Then, lighter weight, high strength aluminum components replaced many of the steel components. Subsequently, titanium components replaced many of the aluminum components further decreasing the weight of the aircraft components. Recently, with the advent of high strength, non-metallic composite materials, such as graphite fibers embedded within a polyimide resin, the titanium components have been replaced with the lighter weight, nonmetallic materials. One example is the bypass duct of the General Electric F404 Augmented Turbofan Engine.

However, the composite materials generally are difficult to mold into properly shaped parts. For example, graphite-polyimide materials are generally characterized by poor handling characteristics, erratic processing response, highly variable molded product quality due to porosity and high shrinkage that can cause micro-cracking and/or delamination of complex contoured parts. This results in high rejection rates for composite parts, expensive labor costs to correct problems and/or expensive molds to obtain a properly dimensioned part.

FIGS. 1–4 disclose three prior art molding systems for molding the bypass ducts of the F404 Engine. FIGS. 1 and 2 show a prior art female mold system 10 used for molding a one-half section of a composite bypass duct. The mold system 10 includes a female mold 12 having an inner portion 14, an outer portion 16, an upper portion 18 and a lower portion 20. Further, the female mold 12 includes flange offsets 22 and 24.

The manufacture of a composite duct will now be discussed. First, a plurality of sheets or plies 25 of resin coated composite material, such as the graphite-polyimide material sheets, are placed on an outer surface 26 of the inner portion 14, forming an initial laminated flange, which is substantially semi-circular in cross-section. Typically, a plurality of plies 25 are first laid on top of each other forming the initial laminated duct section 30. Each ply has a thickness of 12.5 to 15.5 mils, and sufficient plies are utilized to form the necessary thickness, up to 50 plies thick if necessary.

Second, the mold is heated to, for example, 100° F.–150° F. This causes the plies 25 to debulk and to adhere to one another, forming a preliminary laminated duct section 30. The preliminary laminated duct section 30 is porous at this point and requires further compacting to eliminate the excessive porosity. Excessive porosity affects the strength and dimensional characteristics of the parts, such as size and tolerances.

Third, a bag system 40, which is well-known in the art, is placed on an outer surface 42 of the preliminary laminated duct section 30. The bag system 40 conforms to the outer surface 42 of the preliminary duct section 30.

Fourth, the mold system 10 is placed in an autoclave. The bag system is attached to a vacuum source, then the autoclave is pressurized and heated. This compacts the preliminary laminated duct section 30 into its final form and eliminates the porosity problem. Two final-form laminated duct sections are attached to each other in this manner forming a bypass duct for a jet engine.

FIG. 3 shows a prior art male mold system 50 used for molding a bypass duct of an engine. System 50 includes a cylindrical male mold 52 having a cylinder portion 54 and two flange portions 56. Flange restraining plates 58 abut respective flange portions 56.

The manufacture of a composite duct using system 50 will now be discussed. A plurality of sheets or plies 60, similar to plies 25, are laid one on top of each other, and placed on an outer surface 62 of the male mold 52 forming an initial laminated cylindrical duct 65. The mold 52 is then heated to a temperature in the range of about 125° F. to 150° F. This causes the plies 60 to debulk and to adhere to one another, forming a preliminary porous laminated duct 65. Like the preliminary duct section 30, the preliminary duct 65 requires further compacting to eliminate the porosity problem. A bag system 70, similar to bag system 40, is placed on an outer surface 72 of the duct 65 after restraining plates 58 are positioned to reduce wrinkling at the corners. The mold system 50 is then placed in an autoclave and the preliminary laminated duct 65 is compacted into its final shape while simultaneously eliminating the excessive porosity.

FIG. 4 shows a prior art compound male mold system 80 that includes a cylindrical exterior mold 82 having a flange 84 and an interior mold 86 having a flange 88. The exterior male mold 82 slideably receives the interior mold 86. Cauls 90 attach to respective flanges 88 and 84. A plurality of sheets or plies 92, similar to plies 25, are laid one on top of each other adjacent to exterior surfaces of the respective mold parts 82, 86, forming an initial laminated duct 94 similar to duct 65. The molds 82 and 86 are then heated, enabling the plies 92 to adhere to one another, forming a preliminary porous laminated duct. A bag system 96 is placed on an outer surface of the preliminary duct 94. The mold system 80 is then placed in an autoclave, as previously discussed for the other systems 10 and 50, and results in a final duct shape. Mold system 80 provides for a more uniform compaction of the duct flange than mold system 50 because the molds 82 and 86 slideably expand as a function of temperature.

Each of the above-identified systems 10, 50, 80 has drawbacks. The female system 10 forms a duct having properly dimensioned flanges; however, it is an expensive system to operate. The male system 50 forms flanges that lack optimal flange strength and may require subsequent labor-intensive repairs to correct; however, its advantage is that it is inexpensive to operate relative to the female system 10. The male system 80 overcomes the problem of optimization of flange strength of system 50; however, it is expensive to operate due to the cost of the special mold. Additionally, in the systems depicted in both FIG. 3 and FIG. 4, rejection rates are high because of the difficulty in controlling the porosity of the laminate material.

Further, general problems exist with the bag systems such that localized pressure cannot be applied to specific areas of the molded material. The resin tends to squeeze out during curing resulting in a dry unacceptable laminate. The laminated part thickness also tends to vary from part to part because of the difficulty in controlling the process. Another undesirable problem is that upper and lower flange surfaces tend to need extensive subsequent machining because they are nonparallel.

Therefore, it is an object of our invention to provide an apparatus and a method for inexpensively molding composite materials and overcome the deficiencies of the bag systems.

It is a further object of our invention to provide an apparatus and method for manufacturing a composite component resulting in lower rejection rates than that of the prior art.

It is another object of the present invention to provide a more compacted flange having flange surfaces which require less machining because they are closer to being parallel.

SUMMARY OF THE INVENTION

The present invention provides a mold system for a curable composite material. The composite material is generally plies consisting of fibers in a polymeric matrix. The mold receives the uncured plies of the composite material. A restraining member is attached to the mold to restrain a forcing member. The forcing member is positioned between the mold and the restraining member. At least a portion of the uncured plies are positioned between the mold and the forcing member. The forcing member is comprised of an elastomeric material having a high thermal coefficient of expansion. The assembly of plies, mold, forcing member and restraining member is placed in a furnace and heated. As the assembly is heated, the forcing member uniformly expands with increasing temperature. However, since the forcing member is constrained between the restraining member, whose purpose is to restrain the forcing member, the forcing member expands in a preselected direction determined by the shape of the mold, the forcing member, the composite part and the restraining member. The expansion however is limited by the mold. The result is that a uniform pressure is applied to the composite material plies causing them to compact as the temperature is raised. As the temperature is raised, the pressure is uniformly increased and the plies continue to compact until the curing temperature is reached. By careful calculation, the correct size of the forcing member can be determined to provide the desired pressure and desired compaction at the curing temperature of any fiber-matrix composite system.

The present invention also provides a method for molding a curable, laminated composite material plies comprised of fibers in a curable resin matrix. The plies are placed over an outer surface of a mold. The plies are first debulked to form a first moldable structure by raising the temperature of the ply-mold assembly to a first temperature while applying pressure. The structure is then cured by raising the temperature of the resin to a second curing temperature while uniformly increasing the pressure. The pressure is uniformly increased in the debulking steps and the curing steps by including in the ply-mold assembly a restraining member and a forcing member, the forcing member being comprised of an elastomeric material having a thermal coefficient of expansion whereby as the assembly temperature is increased, the forcing member expands. The restraining member constrains the forcing member as it expands so that the expansion of the member is directed in a preselected direction against the moldable structure. Two things happen. First, the forcing member expands toward the mold causing the plies to debulk, that is causing porosity to be forced out of the interply regions. When expansion is no longer possible because of the constraints caused by the mold, the restraining member and the moldable structure itself, a pressure is transmitted by the forcing member against the structure in a uniform manner.

As used herein, the 15 mil ply thickness of the composite plies is a typical ply thickness and includes plies having a thickness of from 12.5 to 15.5 mils.

An advantage of the present invention is that it can be designed to apply a uniform pressure against a simple or complex composite material part in any preselected direction or plurality of directions by the proper design of the mold, the forcing member and the restraining members, resulting in a part closer to near net final configuration, so that less machining is required. The pressure is a direct function of temperature and can be carefully controlled by controlling the design of the forcing member and the curing temperature, although the curing temperature control will be somewhat limited by the material system used.

Another advantage of the invention is that the uniform application of pressure will permit debulking and curing even in intricate corners, such as found in flange sections, without wrinkling in the corners by proper design of the molding tool and forcing member. Wrinkling in corners is particularly troubling defect attributed partly to the difficulty in obtaining uniform pressure in corners for both debulking and curing.

Still another advantage of the present invention is its ability to produce a substantially porosity-free cured composite structure.

DESCRIPTION OF THE PREFERRED EMBODIMENTS

Figure 1:
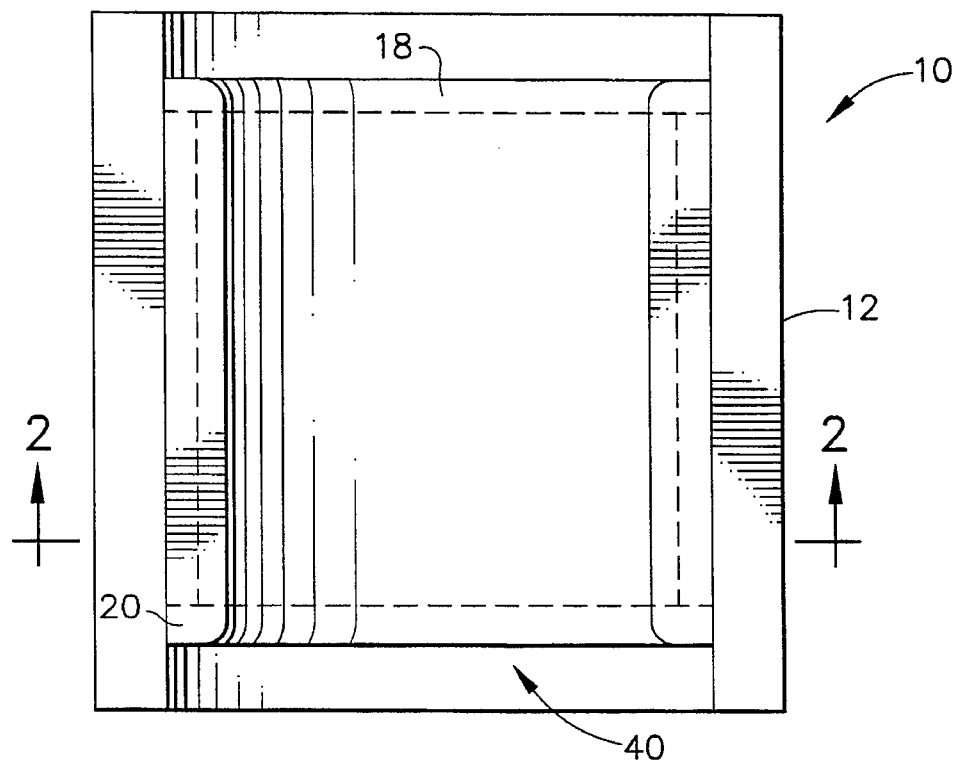
FIG. 1 is a schematic plan view of a prior art female mold.
Figure 2:
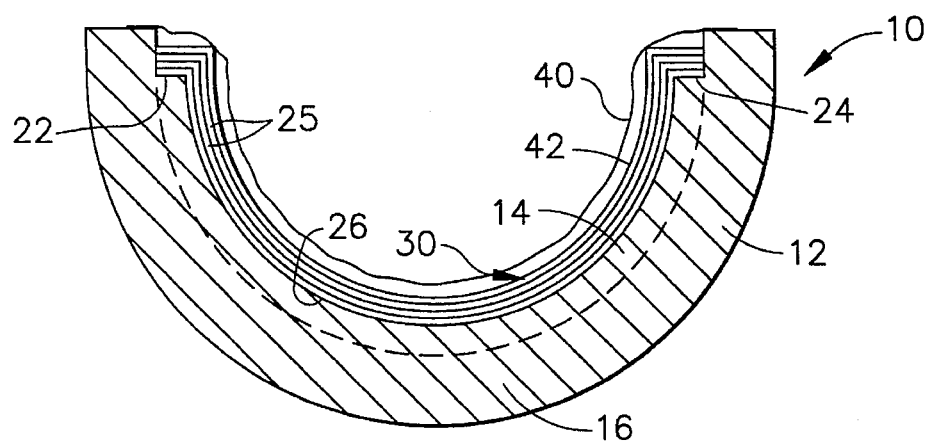
FIG. 2 is a section of FIG. 1 along line 2—2.
Figure 3:
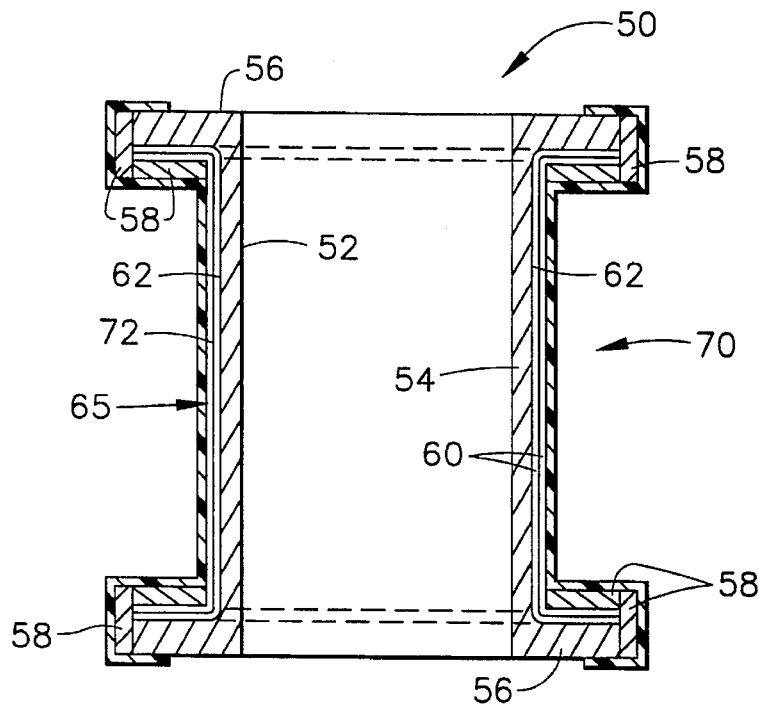
FIG. 3 is a schematic view in an upright section of a first prior art male mold.
Figure 4:
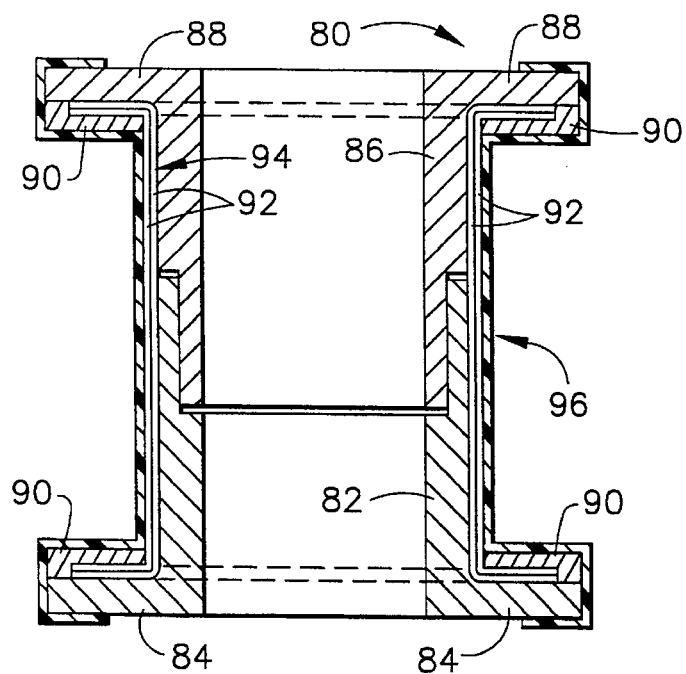
FIG. 4 is a schematic view in an upright section of a second prior art compound male mold.
Figure 5:
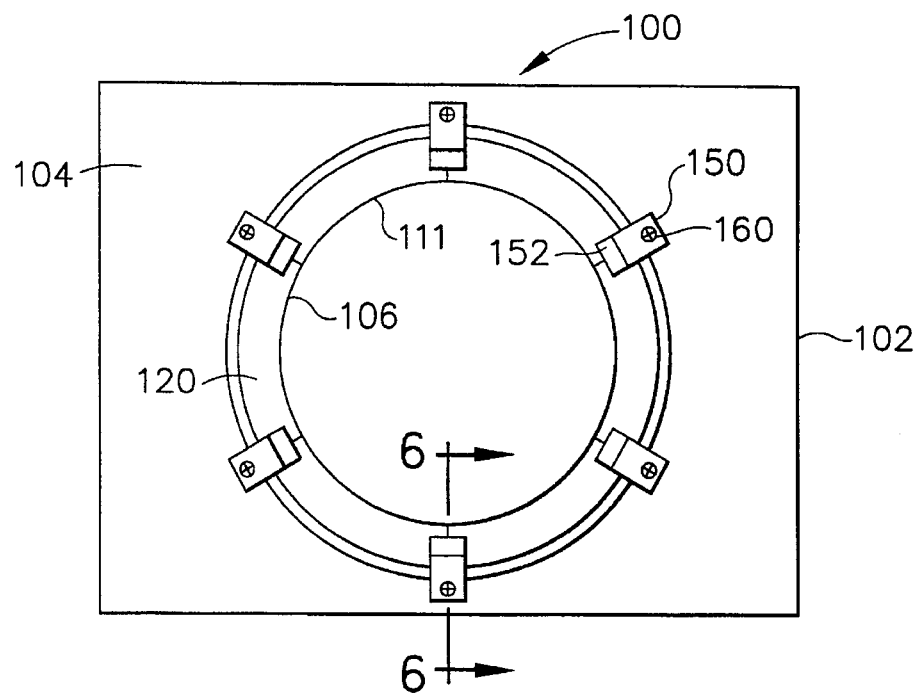
FIG. 5 is a plan view of an irregularly shaped flange mold made in accordance with the present invention.
Figure 6:
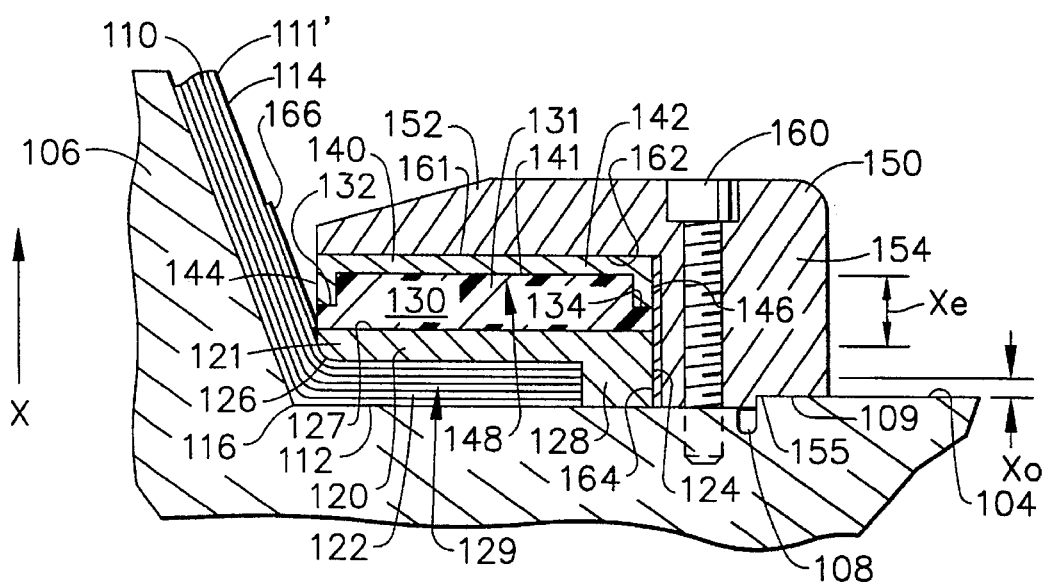
FIG. 6 is a sectional view taken along line 6—6 of FIG. 5.

A first embodiment mold system 100 made in accordance with the present invention is shown in FIGS. 5 and 6. The mold system 100 includes a male mold 102 for manufacturing an irregularly shaped duct. The male mold 102 includes a substantially flat base portion 104 and a curved elevated portion 106. The base portion 104 includes a breathing groove 108 and a stepped portion 109.

A plurality of non-metallic composite sheets or plies 110 are laid one on top of each other over an outer surface of the mold 102 forming an initial laminated duct 111. The initial duct 111 includes a base duct portion 112 and an elevated duct portion 114. The initial duct base portion 112 rests on mold base 104. The initial elevated duct portion 114 rests against the mold elevated portion 106. A juncture 116 is defined between duct portions 112 and 114. Typically, each ply 110 has a thickness of 15 mil and is stacked up to about fifty plies thick, but usually from 8 to 20 plies thick. Although the present invention may be utilized with any fiber-reinforced prepreg-type ply, the preferred plies are carbon fibers such as T-300 fibers manufactured by Union Carbide or Celion fibers manufactured by Celanese, in a resin matrix of a heat setting polyimide such as resin 978 addition polyimide resin manufactured by Fiberite.

Then, mold 102 is heated to a temperature sufficient to debulk the assembled plies, approximately 100° F.–150° F. for the preferred plies. Following debulking, plies 110 are manipulated on mold 102 to form a preliminary non-compacted duct 111 where the plies are fused together, but having a high porosity.

Next, the mold is cooled to ambient room temperature and an L-shaped restraining caul 120 is attached to mold 102. The caul 120 includes an inner surface 121, an elongated body 122 having a first end 124, a curved second end 126 and an outer or upper surface 127. An integral leg 128 extends from the body portion 122. A bottom surface of leg 128 has clearance with mold base 104 to allow for expansion, and integral leg 128, and inner surface 121 of caul on mold base 104 define a recess 129 that receives the base portion 112 of the preliminary duct 111. The caul curved second end 126 abuts against duct juncture 116. Accordingly, duct base portion 112 and duct juncture 116 substantially fill recess 129 and are sandwiched between restraining caul inner surface 121 and mold 102.

Next, an elastomer member or forcing member 130 rests upon the outer surface 127 of caul body 122. The elastomer member 130 includes a body 131, preferably having a substantially rectangular shape, having depending ledges 132 and 134. The elastomer member 130 may be made from Mosite 3902 rubber manufactured by the Mosite Rubber Company of Fort Worth, Tex.; high temperature silicon rubber, such as RTV 31 or RTV 60 manufactured by the General Electric Company, or any other elastomer that can withstand high temperatures within the range of 350° F. to above 600° F. and have a high linear thermal coefficient of expansion on the order of $8.8\times10^{-5}$ in/in/°F. and a volumetric thermal coefficient of expansion on the order of $2.6\times10^{-4}$ in/in/°F.

A U-shaped elastomer restraint 140 rests on an upper surface 141 of the elastomer 130. The restraint 140 includes a base 142 and two depending legs 144 and 146, which define a recess 148 for receiving elastomer body 131. Restraint legs 144 and 146 rest on the elastomer ledges 132 and 134, respectively.

An L-shaped restraining knuckle clamp or member 150 attaches to the mold base 104. The clamp 150 includes a first leg 152 and a second leg 154. In the configuration shown in FIG. 6, a lower surface of leg 154 includes an optional stepped portion 155 that rests on the stepped portion 109 of the mold base 104. A bolt receiving hole passes through the second leg 154 of the clamp 150. At least one corresponding threaded hole is provided in the mold base 104. A bolt 160 passes through the respective holes and attaches clamp 150 to mold 102. An upper surface 161 of the elastomer restraint 140 abuts against a lower surface 162 of the first leg 152 of the clamp 150. Accordingly, the base duct portion 112, restraining caul 120, elastomer member 130 and elastomer restraint 140 are sandwiched in a longitudinal direction between the clamp 150 and the mold base 104.

A spacer plate 164 abuts against respective side surfaces of the caul leg 128, elastomer ledge 134 and restraint leg 146. A protective plate 166 abuts against the lower portion of laminate elevated portion 114 and an upper portion of the curved second end 126 of the caul 120. The plates 164 and 166 are used to properly adjust the spacing between the caul 120 and the restraining portions of the duct 111.

A final compressed thickness of the duct base portion 112 can be determined by the numbers of layers of sheets 110 used. For example, if fifty 15 mil sheets 110 are used for the duct 111, then the base portion 112 thickness nominally should be 0.75" thick. However, due to inadequate compaction of the base portion, the resulting thickness is generally greater than the nominal calculated thickness. We have discovered the following relationship to determine the proper thickness of the elastomer member 130:

$$X_E = \frac{X_0 - X_1}{CTE * \Delta t}$$

where:

$X_E$=elastomer thickness in a first direction X at ambient temperature;

$X_0$=thickness in a first direction of the moldable part prior to curing;

$X_1$=thickness in a first direction of the moldable part after curing;

CTE=coefficient of thermal expansion of the elastomer member; and $\Delta t$=curing temperature—ambient temperature.

Once the curing temperature is determined for a particular material system, then the elastomer thickness can be calculated. The mold system 100 is then placed in an autoclave with a bag as previously discussed, which is evacuated to 20" of mercury and heated to an elevated temperature, typically in the range of 300° F.–600° F. for the preferred material system discussed above. The elastomer 130 then expands downwardly, due to the thermal coefficient of expansion, toward mold base 104 applying a pressure against the base portion 112. This causes the plies 110 in the vicinity of base portion 112 to compress and force any entrained gasses to escape, thereby substantially reducing or eliminating porosity while simultaneously preventing wrinkling of plies at duct juncture 116. The mold 102 is then cooled and the finished duct 111 can be removed.

Actual prototype ducts have been manufactured from the above mold system 100 from the above method having porosity under 3%.

Figure 7:
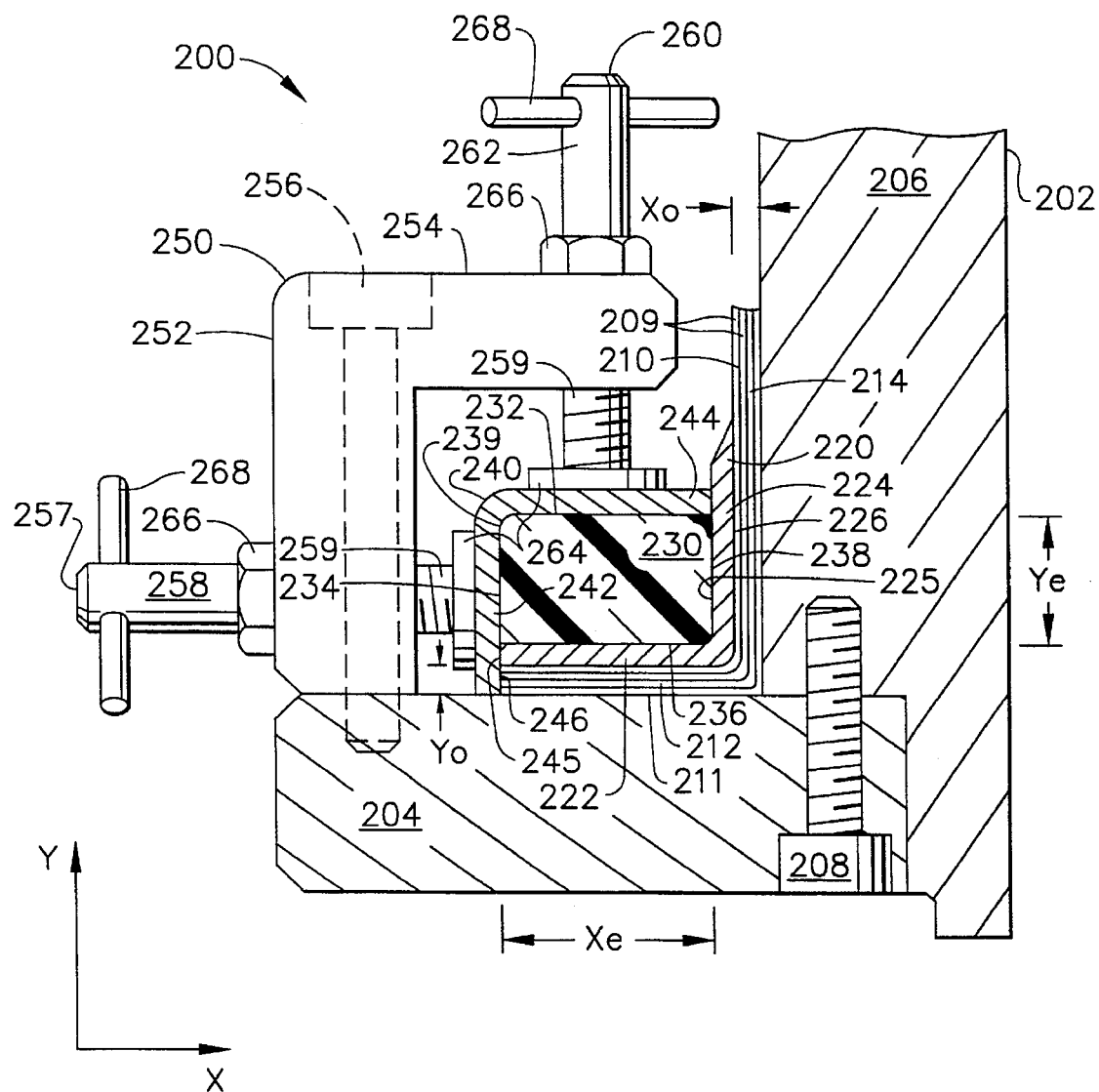
FIG. 7 is a sectional view of a second embodiment of the present invention.

FIG. 7 discloses a second, preferred embodiment of the invention, a two degree of freedom mold system 200. The mold system 200 includes a two piece male mold 202 having a flat base portion 204 and an elevated portion 206. Elevated portion 206 fixably attaches to base portion 204 by at least one bolt 208, although a plurality of bolts is preferred, through a corresponding threaded hole. A plurality of sheets or plies 209, one laid on top of the other, form a laminated structure 210 having an L-shaped cross-section comprised of a flat leg 212 and an elevated leg 214. A lower surface 211 of the structure 210 rests on inner or upper surfaces of base 204 and elevated portion 206. Structure 210 is preformed in the same manner as that of duct 111.

The mold system also includes an L-shaped restraining caul 220 having a first leg 222, a second leg 224, an outer or upper surface 225 and an inner or lower surface 226. Respective inner surfaces 226 of caul legs 222 and 224 rest on structure legs 212 and 214.

The caul outer surface 225 receives a rectangular cross-sectional shaped elastomer or forcing member 230 having four side surfaces 232, 234, 236 and 238. The elastomer member 230 is made of the same material as elastomer member 130. Sides 236 and 238 rest on the outer surfaces 225 of respective caul legs 222 and 224. An inner surface 239 of an L-shaped elastomer restraint 240 rests against surfaces 232 and 234 of the elastomer 230, an outer edge 245 of second caul leg 222 and an outer edge 246 of structure flat leg 212. L-shaped restraint also bears against second leg 224 of restraining caul 220.

An L-shaped restraining knuckle clamp 250 fixably attaches to mold base 204. The clamp 250 includes a first leg 252 and a second leg 254. A bolt 256 passes through leg 252 and into base 204. A first adjustment screw 257 having a first threaded shaft 258 and a detachable second threaded shaft 259 passes through leg 252. A second adjustment screw 260 having a first threaded shaft 262 and a detachable second threaded shaft 259 passes through leg 254. Legs 252 and 254 threadably receive shafts 259 by respective threaded bores. Each shaft 259 includes head 264 attached to one end. A handle 268 attached to each adjustment screw 257,260. Each shaft 259 threadably receives a locking nut 266 between the head 264 and handle 268. The handles 268, shown in place for illustration purposes in FIG. 7, are rotated in the clockwise direction until head 264 contacts the respective legs 242 and 244 of elastomer restraint 240. The locking nuts 266 are threaded over detachable shafts 259 and then tightened to abut against respective clamp legs 252 and 254 After sufficient pressure is applied to elastomer restraint 240 by shafts 259, shafts 259 are locked into place by locking nuts 266 or other suitable means such as a cotter pin Adjustment screws 257, 260 and handles 268 are removed to allow placement of a bag for autoclave curing. After shafts 259 are locked in place and adjusting screws 257, 260 and handles 268 have been removed, locking nuts 260 may optionally be removed from the assembly if shafts 259 are locked by another locking method.

The two degree mold system 200 enables compaction of the laminate structure 210 in both the X and Y direction; thereby compacting both the laminate of the first leg 212 and a portion of the laminate of the second leg 214. The following relationships exist to determine the proper thickness of the elastomer 230:

$$X_E = \frac{X_0 - X_1}{CTE * \Delta t}$$

and $$Y_E = \frac{Y_0 - Y_1}{CTE * \Delta t}$$

where:

$X_E$=elastomer member thickness in the X direction at ambient temperature;

$X_0$=thickness in the X direction of the moldable part prior to curing;

$X_1$=desired thickness in the X direction of the moldable part in the X direction;

$Y_E$=elastomer member thickness in the Y direction at ambient temperature;

$Y_0$=thickness in the Y direction of the moldable part prior to curing;

$Y_1$=desired thickness in the Y direction of the moldable part;

CTE=coefficient of thermal expansion of the elastomer; and $\Delta t$=curing temperature—ambient temperature.

As can be seen, the elastomer system could also be used for compressing a structure in one, two or three dimensions.

Once the above parameters are determined, then the proper thickness of the elastomer 230 in both the X and Y directions can be calculated.

Then the mold system 200 is placed in an autoclave and heated in a similar manner as previously discussed for mold system 100.

Figure 8:
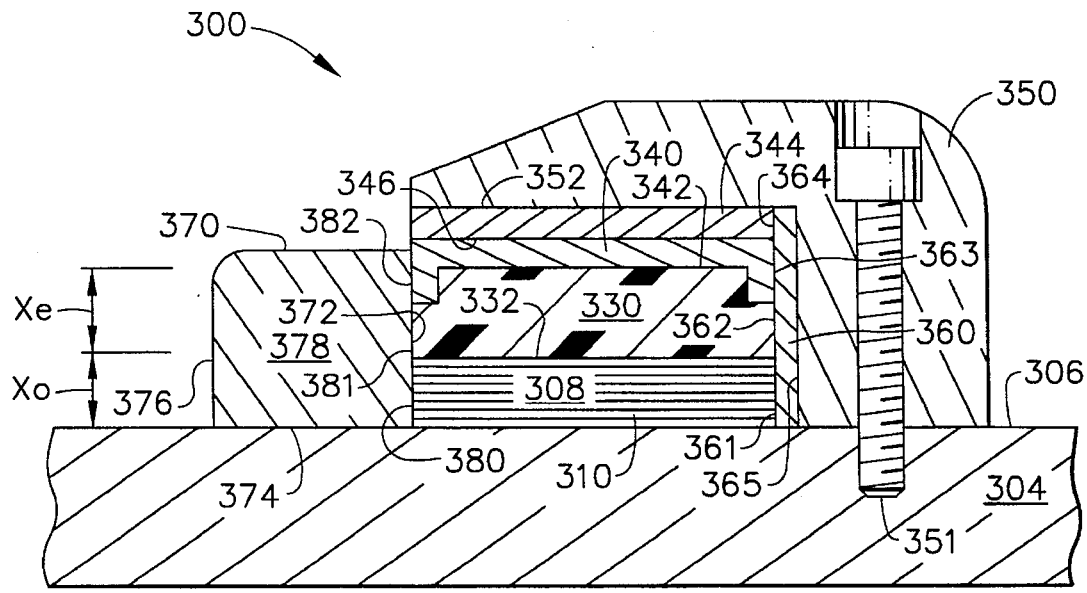
FIG. 8 is a sectional view of a third embodiment of the present invention.

FIG. 8 shows a cap mold system 300 made in accordance with the present invention. Mold system 300 is similar to mold system 100 shown in FIGS. 5 and 6 except mold system 300 is used for flat parts. Mold system 300 includes a flat base plate 304 having an upper surface 306. A plurality of plies 308, similar to plies 110, one laid on top of the other, form a laminated, rectangular, cross-sectional shaped structure 310. A lower surface of structure 310 rests on the upper surface 306 of the plate 304. The structure 310 is preformed in the same manner as that of duct 111. An elastomer member 330, similar to elastomer member 130, rests on an upper surface 332 of the laminate structure. The elastomer member thickness is calculated in the same manner as that for elastomer member 130. A U-shaped elastomer restraint 340, similar to elastomer restraint 140, receives an upper surface 342 of the elastomer 330. A spacer plate 344 rests on an upper surface 346 of restraint 340.

An L-shaped restraining knuckle clamp 350, similar to clamp 150, attaches to base 304 by a bolt 351. Clamp 350 also abuts an upper surface 352 of spacer plate 344. A second spacer plate 360, having two sides, is sandwiched between, on a first side, a structure edge 361, an elastomer member edge 362, a restraint edge 363, and spacer plate edge 364, and, on a second side, an inner surface 365 of clamp 350.

A rectangular dam 378 rests upon the upper surface 306 of base plate 304 and includes sides 370, 372, 374 and 376. Dam side 372 abuts against a second structure edge 380, a second elastomer member edge 381 and a second restraint edge 382.

The laminated structure 310 is compacted in the same manner as previously described for duct 111 in an autoclave.

Figure 9:
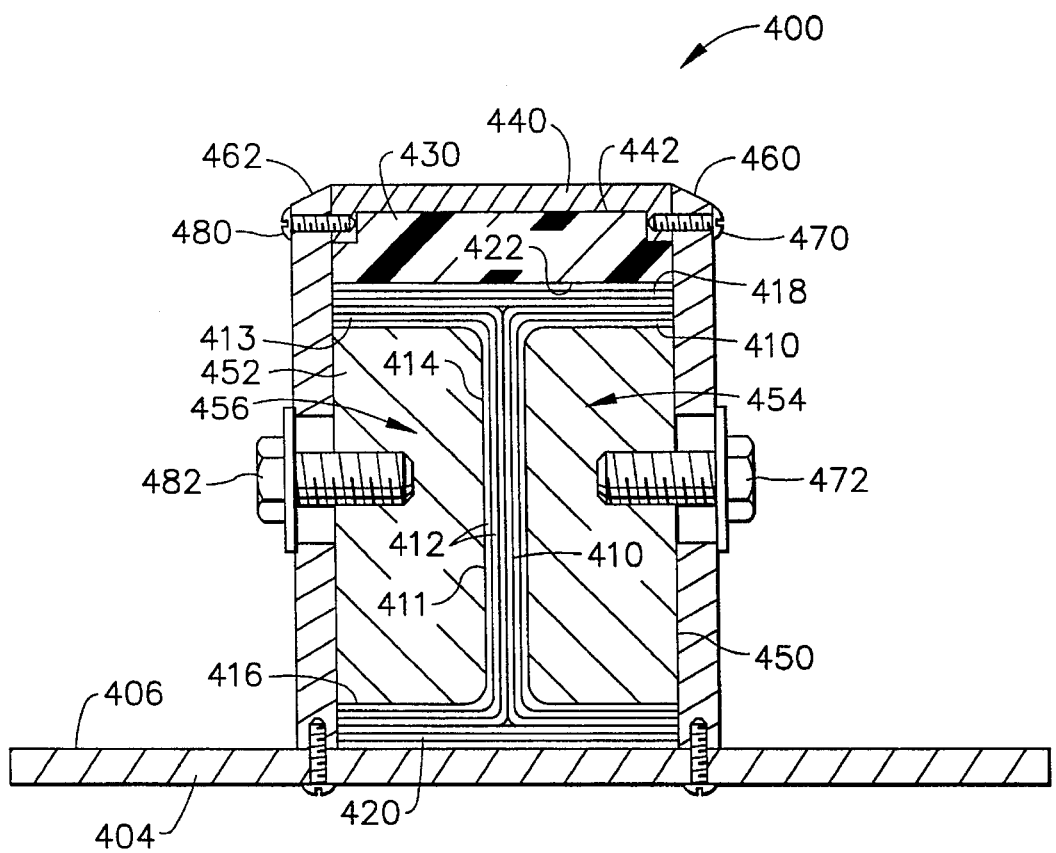
FIG. 9 is a sectional view of a fourth embodiment of the present invention for manufacturing I-beams.

FIG. 9 shows an I-beam mold system 400 made in accordance with the present invention. The I-beam mold system includes a flat base 404 having an upper surface 406. A laminated I-beam structure 410 rests on the base upper surface 406. The I-beam includes three sections: an interior I-beam 411 made up of the plurality of plies 412, similar to plies 110, one laid on top of each other to form a laminated, I-beam, cross-sectional shaped structure having a top flange portion 413, a web portion 414 and a bottom flange portion 416; a supplemental upper portion 418; and a supplemental lower portion 420. The supplemental upper portion 418 and the supplemental lower portion 420 are made of pre-compacted, laminated structures, such as structure 310. However, supplemental upper portion 418 and supplemental lower portion 420 are imidized and not fully cured. Imidizing is accomplished after debulking by heating to an elevated temperature below the curing temperature so that portions 418, 420 may be handled as structures rather than an mere assembly of plies. The structure 410 is then preformed with the structure 310 in the same manner as that of duct 111.

An elastomer member 430, similar to elastomer member 130, rests upon an upper surface 422 of supplemental upper portion 418. An elastomer restraint 440, similar to the restraint 130, rests on an upper surface 442 of elastomer member 430. Mandrels 450 and 452 are received in respective cavities 454, 456 defined by the flanges 413, 416 and web portion 414 of the interior I-beam 411, as shown. Although elastomeric material may also be used as mandrels 450, 452 next to web portion 414 and bottom flange portion 416, to provide for compaction of these portions if necessary or if desired, proper compaction of these regions is not as critical as compaction of top flange portion 413 and supplemental upper portion 418 because the upper portion of the I-beam is generally the most highly stressed portion of the I-beam and therefore least tolerant of defects. In fact, the interior I-beam 411 can be preformed about mandrels 450 and 452. Connecting links 460 and 462 sandwich I-beam 410, elastomer member 430, elastomer restraint 440 and the mandrels 450 and 452. Connecting links 460, 462 threadably attach to elastomer restraint 440 by bolt arrangements 470 and 480. The mandrels 450 and 452 are slideably attached in the X direction to the connecting links 460 by threaded washer assemblies 472, 482.

The thickness of the elastomer in the X direction is precalculated as previously discussed. The I-beam is then cured as previously discussed. As the elastomer expands in the X direction, I-beam 411 is compressed in the X direction and the mandrels 450 and 452 move downwardly toward base 404 thereby compressing the bottom flange portion 416 of the interior I-beam 411. The interior I-beam plies 412 cure and attach to supplemental portions 418 and 420. Accordingly, once the mold is cooled, a unitary I-beam is formed.

The use of the elastomer members 130, 230, 330 and 430 solve many existing problems and deficiencies of the bag systems 40, 70 and 96. For example: 1) High localized pressures can be applied by the elastomers which is not possible with the bag systems; 2) Unlike the bag systems, the elastomers gradually apply uniform pressure to the molded part with increasing temperature, thereby preventing squeeze-out of the resin, resulting in a unacceptable dry laminate; 3) Unlike the bag systems, the elastomers enable the molder to empirically calculate the final thickness of the molded part; 4) Unlike the bag systems, the elastomers eliminate the need for pre-conditioning of high porosity laminates; 5) Unlike the bag systems, the elastomers enable the upper and lower molded surfaces to be molded parallel to each other and substantially reduce secondary machining of the flange surfaces; 6) Unlike the bag systems, the elastomers provide the flexibility of an autoclave for large/complex parts which cannot be press molded; and 7) The elastomers provide the advantages of an inexpensive male mold tool with the quality of a female tool molded part.

Further, the above laminates need not be limited to the above described resins and composite materials, but can include any composite and resin materials which must be cured at elevated temperatures.

Having described the presently preferred embodiments of our invention, it is to be understood that it may otherwise be embodied within the scope of the appended claims.

We claim:

1. A method for molding a heat setting laminated composite material, the method comprising the steps of:

placing a plurality of heat setting laminated plies, one on top of each other, over an outer surface of a mold, the plies including fibers in a curable resin matrix to form a moldable structure characterized by a curing temperature;

debulking the moldable structure by heating to a first temperature below the curing temperature; and heating the moldable structure within an autoclave to the curing temperature while applying a first pressure to the moldable structure with the autoclave and applying a second pressure against a portion of the moldable structure with a forcing member, the second pressure being in addition to the first pressure applied by the autoclave, the forcing member being constrained such that the second pressure is applied in a preselected direction against the portion of the moldable structure by thermal expansion of the forcing member during the heating, the forcing member having a sufficient size and sufficient coefficient of thermal expansion such that the second pressure uniformly increases with increasing temperature until the second pressure exceeds the first pressure when the curing temperature is reached.

2. The method as set forth in claim 1, wherein the debulking step further comprises applying a third pressure to the portion of the moldable structure with the forcing member, wherein the portion is sandwiched between the mold and the forcing member in the preseleeted direction and the third pressure is limited to being directed against the portion of the moldable structure.

3. The method as set forth in claim 1 wherein the forcing member has a thickness in the preselected direction determined by the following equation:

$$X_E = \frac{X_0 - X_1}{CTE * \Delta t}$$

where:

$X_E$=the thickness of the forcing member;

$X_O$=thickness of the portion of the moldable structure to be compressed in the preselected direction at the ambient temperature prior to the heating step;

$X_1$=desired thickness of the portion of the moldable structure in the preselected direction after the heating step;

CTE=the coefficient of thermal expansion of the forcing member; and $\Delta t$=the curing temperature—the ambient temperature.

4. The method as set forth in claim 1 wherein the plies include graphite fibers in a polyimide resin matrix, the first temperature is in the range of 100° F.–150° F. and the curing temperature is between 350° F.–600° F.

5. The method as set forth in claim 1 wherein the moldable structure is rectangular in cross-section, the method further comprising the steps of:

heating the moldable structure after the debulking step to an imidizing temperature to form a first imidized structure;

debulking a second plurality of heat setting laminated plies comprising fibers in a heat setting resin matrix so as to form a second moldable structure, and then heating the second moldable structure to an imidizing temperature to form a second imidized structure; and then placing the first imidized structure on the second imidized structure;

wherein the heating step entails heating the first imidized structure and the second imidized structure to the curing temperature such that the forcing member expands in the preselected direction and compresses overlying portions of the first and second imidized structures, thereby forming a final cured structure.

* * * * *